Feb. 23, 1954    J. BELL ET AL    2,670,448
ELECTRIC MOTOR

Filed Jan. 23, 1951    2 Sheets-Sheet 1

Inventors
J. Bell
F. H. Cannon
By Clavert Downing Ficht Attys

Feb. 23, 1954 J. BELL ET AL 2,670,448
ELECTRIC MOTOR

Filed Jan. 23, 1951 2 Sheets-Sheet 2

Inventors
J. Bell
F. H. Cannon
By Hancock Downing Rubla
Attys.

Patented Feb. 23, 1954

2,670,448

UNITED STATES PATENT OFFICE 2,670,448

ELECTRIC MOTOR

John Bell and Frank Herbert Cannon, Beckenham, England, assignors to Muirhead & Company Limited, Beckenham, England Application January 23, 1951, Serial No. 207,400

Claims priority, application Great Britain January 27, 1950

1 Claim. (Cl. 310—154)

This invention relates to electric motors of the kind having a wound rotor and a permanent field magnet system of high efficiency magnet steel associated with flux-conducting members conveying the flux from said magnet to pole pieces, hereinafter termed "rotor pole pieces," adjacent to the rotor, and has as object the provision of means for varying the speed of such a motor.

Electric motors of the kind referred to are superior in respect of efficiency to those of similar size having a wound stator because the field excitation losses are dispensed with, it being understood that only those motors generally classified as "small" come into consideration, but they have the drawback that they are usually capable only of running at a speed proportional to the voltage applied to the armature.

According to this invention, an electric motor of the kind referred to is provided with means for varying the proportion of the flux from the permanent field magnet system conducted by the flux conducting members to and across the rotor pole pieces.

Thus, said means may comprise a magnetic shunt movable in relation to the flux conducting members, or it may comprise adjusting means for the relative location of the field magnet and the flux conducting members.

Further features of this invention appear hereinafter.

In a preferred construction in which a permanent magnet or magnets connect two elongated flux-conducting elements formed intermediate in their length to provide pole pieces for the armature, between the opposite ends of the elements there is located a further movable permanent magnet which may be fitted with appropriate pole shoes or alternatively may be shaped without pole shoes to a cylindrical or part cylindrical form.

In a given position the magnetic flux from the magnets aids in producing flux across the rotor pole pieces, but if the movable magnet is rotated through any angle up to 180° the magnetic flux from the fixed magnet or magnets is in effect shunted by the movable magnet and the flux across the rotor pole pieces is thereby reduced.

If the movable and fixed magnets are of equal section the working flux can be altered from the maximum value to approximately zero. In an alternative arrangement the movable magnet may have a less section than the fixed magnet, and the working flux will then be varied between limits, say, from normal (100%) to 20% or 30% of normal.

Any convenient form of adjusting and locking devices may be provided for rotating the movable magnet, so that the working flux may be smoothly adjusted to any desired value. The pole shoes or the pole faces of the movable magnet may be suitably shaped, for example skewed, to provide for more smoothly controlling the working magnetic flux.

In an alternative construction, the permanent magnets or one of them may be arranged to be slid to a greater or less extent into or out of register with the flux-conducting members providing or holding the pole pieces for the rotor.

In a further alternative construction, a magnetic shunt or shunts, suitably of relatively soft iron, may be provided and adjustably located in relation to the flux-conducting members to divert a greater or lesser amount of magnetic flux from across the rotor pole pieces.

Various embodiments of this invention and details thereof are shown diagrammatically in the accompanying drawings, in which.

Figure 1:
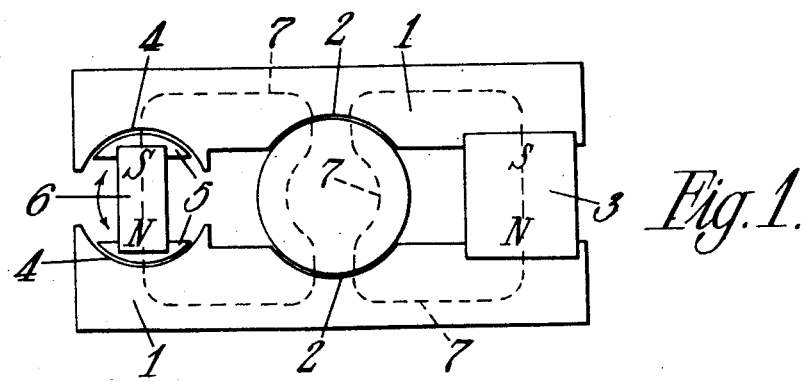
Figure 1 shows one arrangement of parts for producing a variable field.

In the arrangement shown in Figure 1, two flux-conducting members 1 are formed at 2 to provide rotor pole pieces, and bridged by fixed permanent magnet 3 of high efficiency magnet steel with north and south poles as marked. At the other end of members 1, pole pieces 4 are formed to co-operate with pole shoes 5 of permanent magnet 6, with north and south poles as marked. Magnet 6 is mounted for rotation at its centre about an axis (not shown) normal to the plane of the figure, and is also constructed of high efficiency magnet steel. In the position shown, both magnets co-operate in producing a magnetic flux across pole pieces 2 in the region occupied by the rotor (not shown) as indicated by the dotted lines 7 but, on rotation of magnet 6, its contribution to this flux will progressively diminish and it will eventually divert flux originating from magnet 3 from the region between pole pieces 2 to itself, this diversion reaching a maximum when its direction is reversed. Magnet 6 is shown as being smaller than magnet 3, so that some flux will always pass across the rotor pole pieces 2; reduction substantially to zero could be effected by making these magnets of the same effective strength.

Figure 2:
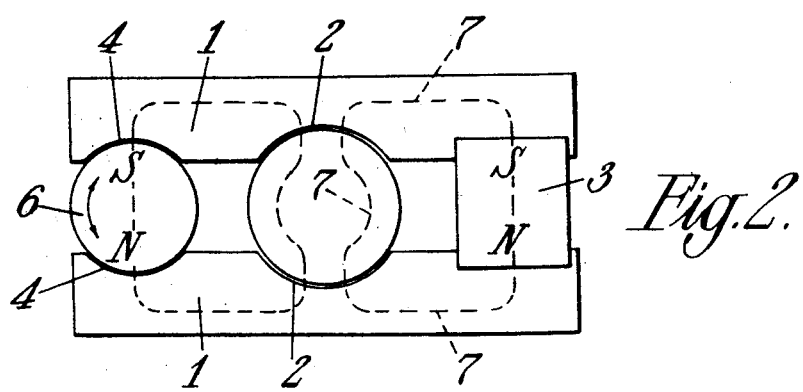
Figure 2 shows a similar, slightly modified arrangement.

The arrangement shown in Figure 2 is similar, except that magnet 3 is formed as a cylinder or part cylinder instead of as a bar with pole shoes, and the operation is the same.

Figure 3:
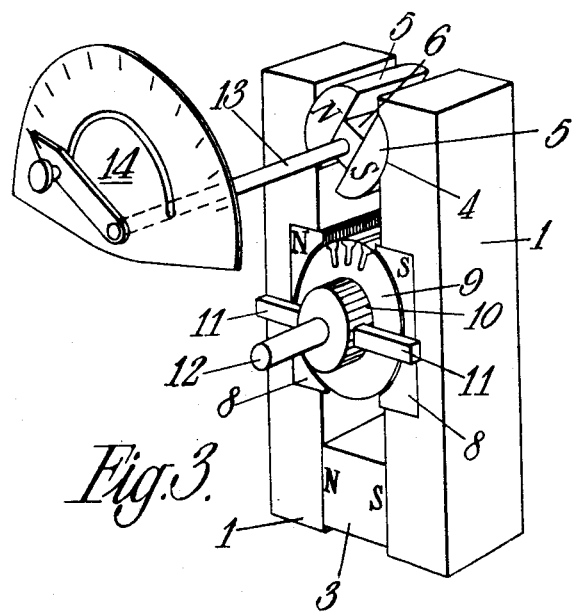
Figure 3 shows a perspective view of a motor embodying an arrangement similar to that of Figure 1.

The motor shown in Figure 3 embodies the field-producing arrangement of Figure 1, with the exception that laminated pole shoes 8 are provided on members 1 instead of formed pole pieces 2. The rotor 9 is fitted with commutator 10 and associated brushes 11 and mounted on axle 12, while magnet 6 is mounted on axle 13 associated with dial and pointer 14. Suitable bearings, not shown, are provided for axles 12 and 13 together with a locating means, not shown, for axle 13. The locating means may be a brake or locking device, or a stud and co-operating sockets associated with dial and pointer 14.

Figure 4:
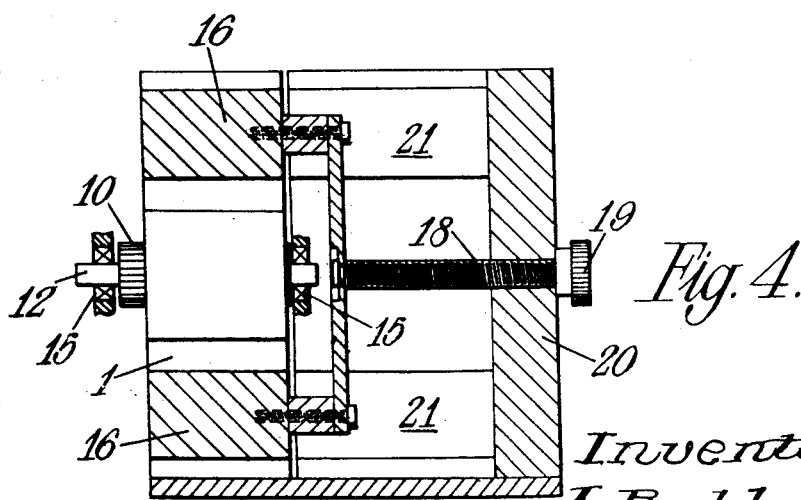
Figure 4 shows a semi-sectional view of the essential features of another embodiment.

The embodiment shown in Figure 4 also comprises flux conducting members 1 and a rotor with commutator 10 mounted on axle 12, the axle bearings being shown in part at 15, but instead of magnets 3 and 6 it has magnets 16 adapted to slide in and out of register with members 1, the magnet locating means comprising cross-member 17 bolted to the magnets and adapted to be moved towards and away from members 1 by a threaded rod 18 provided with adjusting knob 19 bearing against a further, fixed cross member 20 attached to shunt poles 21 between which magnets 16 may slide. In the figure, magnets 16 are shown in their innermost position between members 1, the latter being superposed in the part sectional view shown.

Figure 5:
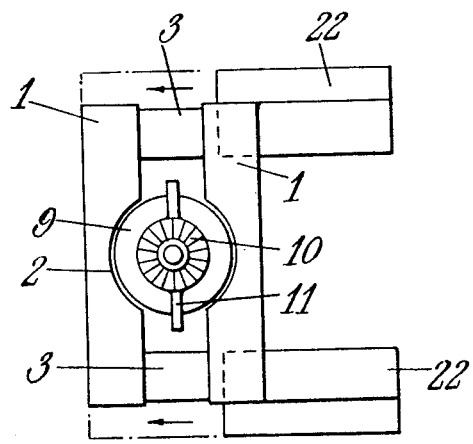
Figure 5 shows a side view of a still further embodiment.

Figure 5 shows a still further embodiment, in which permanent magnets 3 are fixed between members 1 in a manner similar to the arrangement of single magnet 3 of Figure 1, and shunts 22 are provided, adapted to be slid from the position shown to a position in which they bridge each end of members 1 to divert flux from the pole pieces 2.

It will be understood that the permanent field magnet system referred to may be constituted by a single magnet or by two or more suitably disposed magnets.

Further, a motor constructed in accordance with this invention can also be used as a generator, in which case it will be possible to vary the ratio between the speed at which it is driven and the voltage generated.

We claim:

In an electric motor of the kind having a wound rotor and a permanent field magnet system of high efficiency magnet steel associated with flux-conducting members conveying the flux from the magnet to pole-pieces adjacent to the rotor, the improvement which consists in providing a further permanent magnet between the flux-conducting members, which is adjustable to a number of fixed positions so that the field at the pole-piece may be adjusted to any value in the range between the sum and the difference of the fluxes of the two magnets for the purpose of controlling the speed of the motor.

JOHN BELL.
FRANK HERBERT CANNON.

References Cited in the file of this patent

UNITED STATES PATENTS

| Number | Name | Date |
| --- | --- | --- |
| 437,704 | Lundell | Oct. 7, 1890 |
| 781,968 | Sachs | Feb. 7, 1905 |
| 1,005,293 | Parsons et al. | Oct. 10, 1911 |
| 1,157,414 | Neuland | Oct. 19, 1915 |
| 1,412,933 | Gordon | Apr. 18, 1922 |
| 2,502,628 | Maynard | Apr. 4, 1950 |